UNITED STATES PATENT OFFICE.

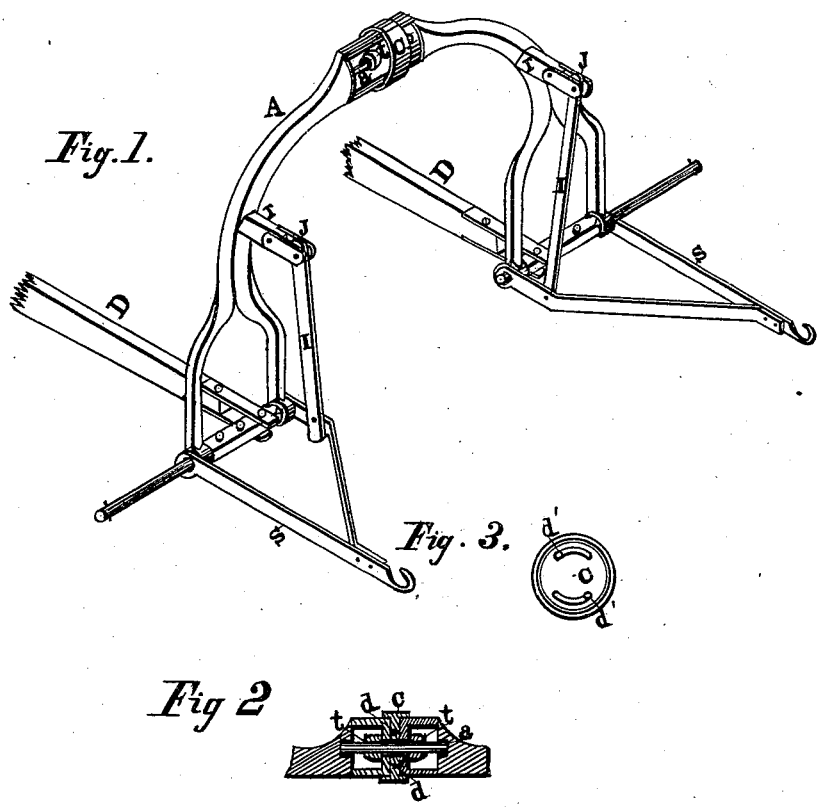

THOMAS J. PRICE AND ALMON HUNT, OF MACOMB, ILLINOIS.

IMPROVEMENT IN CULTIVATORS.

Specification forming part of Letters Patent No. 170,395, dated November 23, 1875; application filed July 22, 1875.

*To all whom it may concern:*

Be it known that we, THOMAS J. PRICE and ALMON HUNT, residents of Macomb, in the county of McDonough and State of Illinois, have invented a new and useful Improvement in Cultivators; and we do hereby declare that the following is a full, clear, and exact description of the same, reference being had to the accompanying drawings, forming a part of this specification, in which—

Figure 1 is a perspective view of our improvement. Fig. 2 is a section, showing the coupling in the center of the arch. Fig. 3 is a detached portion of the arch-coupling, which will be described in the general description.

The nature of our invention relates to that class of cultivators that runs astride the row, cultivating both sides of the plant simultaneously; and its novelty consists, first, in a joint or coupling in the arch, causing it to act as an evener, so that either plow can advance forward without affecting the other; second, in a draft-frame provided with suitable appliances to keep the arch in a vertical position, and to allow sufficient vibration to keep them in the line of draft.

In the drawing, Fig. 1, A represents the arch, which is made in two halves, and curved to form a half-circle. The lower end of each half is forked, forming two arms, into which the spindles for the wheels are firmly fixed. The upper ends are also forked, to which a face-plate is firmly attached. These face-plates have pins $d\,d$, one attached at the upper edge of one plate, and the other attached to the lower edge of the other. (See Fig. 2.) These pins pass through the slots in the lock-plate $c$, which has projecting rims on each side, to prevent dust from getting into the joint. By means of this lock-plate C the arch is only allowed to turn a certain distance, until the pins $d\,d$ arrive at the ends of the slots, (see Fig. 3,) otherwise the arch would turn around, and would not have the desired effect. The arch is coupled together by passing the rod $a$ through the lock-plate C, then through the face-plate and washer $t$, back into the bearing. The other half is then placed on the pin in like manner. The washers $t\,t$ are held to their places by pins passing through the rod $a$. D D represent the plow-beams, which are attached by means of suitable couplings placed between the lower prongs of the arch, and on the same rod that forms the spindles. The draft-frames S S are attached, also, to the rod that formes the spindles. (Shown clearly in Fig. 1.) The outward end is provided with a hook, to which the single-tree is attached. These frames have pivoted to them the rods I I, and these rods at the upper end are pivoted to the links J J, which are also pivoted to the projecting blocks $r\,r$, on the arch A.

The rods I I are for the purpose of keeping the arch in a vertical position, and, by means of the links J J, allow the necessary vibration of the arch, and also the necessary movement of the draft-frames, to keep them in the line of draft in case one animal should advance forward of the other.

The operation is as follows: When the draft is applied to the draft-frames S S, the rods I I raise the arch up to a vertical position, and if one animal should advance forward of the other, it only draws forward that side of the cultivator without affecting the other in the least, causing each animal to draw its own side of the plow, the arch acting as an evener.

Having thus fully described our invention, what we claim as new, and desire to secure by Letters Patent, is—

1. The combination of the arch A, in two parts, and swiveled in or near its center, with the draft-frames S S, rods I I, and pivoted links J J, as and for the purpose set forth.

2. The lock-plate C, with circular grooves $d$, and overlapping flange $c$, in combination with the rod $a$ and the sectional arch A, having face-plates and studs $d$, all constructed substantially as shown and described.

THOS. J. PRICE.
A. HUNT.

Witnesses:
A. J. THOMAS,
W. O. THOMAS.